(12) United States Patent
Khlat

(10) Patent No.: US 9,837,712 B2
(45) Date of Patent: Dec. 5, 2017

(54) ANTENNA ARRAY CALIBRATION FOR WIRELESS CHARGING

(71) Applicant: RF Micro Devices, Inc., Greensboro, NC (US)

(72) Inventor: Nadim Khlat, Cugnaux (FR)

(73) Assignee: Qorvo US, Inc., Greensboro, NC (US)

( * ) Notice: Subject to any disclaimer, the term of this patent is extended or adjusted under 35 U.S.C. 154(b) by 173 days.

(21) Appl. No.: 14/843,465

(22) Filed: Sep. 2, 2015

(65) Prior Publication Data

US 2016/0087337 A1 Mar. 24, 2016

Related U.S. Application Data

(60) Provisional application No. 62/052,517, filed on Sep. 19, 2014.

(51) Int. Cl.
*H01Q 3/26* (2006.01)
*H02J 7/02* (2016.01)
(Continued)

(52) U.S. Cl.
CPC ............ *H01Q 3/267* (2013.01); *B60L 11/182* (2013.01); *H02J 7/0027* (2013.01); *H02J 7/025* (2013.01); *H02J 50/10* (2016.02); *B60L 2240/547* (2013.01); *B60L 2240/549* (2013.01); *B60L 2270/147* (2013.01); *Y02T 10/7011* (2013.01); *Y02T 10/7072* (2013.01); *Y02T 90/122* (2013.01); *Y02T 90/14* (2013.01)

(58) Field of Classification Search
CPC .............. B60L 11/182; B60L 2240/547; B60L 2240/549; B60L 2270/147; H02J 7/0027; H02J 7/0025; H02J 50/10; Y02T 10/7011; Y02T 10/7072; Y02T 90/14; Y02T 90/122; H01Q 3/267
See application file for complete search history.

(56) References Cited

U.S. PATENT DOCUMENTS 5,469,172 A * 11/1995 Schleder ............... G01S 7/4004
342/174
6,573,862 B2 * 6/2003 Vail ......................... H01Q 1/38
342/174
(Continued)

*Primary Examiner* — Naum B Levin
(74) *Attorney, Agent, or Firm* — Withrow & Terranova, P.L.L.C.

(57) ABSTRACT

Antenna array calibration for wireless charging is disclosed. In one aspect, an initial calibration sequence is performed each time a wireless charging station is powered on. The initial calibration sequence utilizes a reference antenna element, which is an antenna element randomly selected from a plurality of antenna elements in the wireless charging station, to determine relative receiver phase errors between the reference antenna element and each of the other antenna elements in an antenna array. In another aspect, a training sequence is performed after completing the initial calibration sequence to determine total relative phase errors between the reference antenna element and each of the other antenna elements in the antenna array. Adjustments can then be made to match respective total relative phase errors among the plurality of antenna elements to achieve phase coherency among the plurality of antenna elements for improved wireless charging power efficiency.

20 Claims, 9 Drawing Sheets

(51) Int. Cl.
*H02J 7/00* (2006.01)
*H02J 50/10* (2016.01)
*B60L 11/18* (2006.01)

(56) References Cited

U.S. PATENT DOCUMENTS

| | | | |
|---|---|---|---|
| 6,690,952 B2 * | 2/2004 | Nishimori | H01Q 3/2605 342/174 |
| 6,690,953 B2 * | 2/2004 | Rexberg | H01Q 3/267 342/174 |
| 6,735,182 B1 * | 5/2004 | Nishimori | H01Q 3/26 342/372 |
| 7,358,892 B2 * | 4/2008 | Thome | G01S 7/288 342/165 |
| 8,014,366 B2 * | 9/2011 | Wax | H04W 72/046 370/328 |
| 8,358,728 B2 * | 1/2013 | Husted | G01S 19/235 375/326 |
| 8,730,111 B2 * | 5/2014 | Sakata | G01R 29/105 343/703 |
| 8,754,811 B1 * | 6/2014 | Uscinowicz | H01Q 3/267 342/375 |
| 2002/0042290 A1 * | 4/2002 | Williams | H04B 7/1555 455/562.1 |
| 2015/0222336 A1 * | 8/2015 | Yilmaz | H04B 7/024 370/252 |
| 2015/0255868 A1 * | 9/2015 | Haddad | H04B 17/12 342/368 |
| 2015/0381228 A1 * | 12/2015 | Milenkovic | H04B 17/12 375/219 |
| 2016/0049995 A1 * | 2/2016 | Andre | H04B 7/04 370/277 |
| 2016/0087338 A1 * | 3/2016 | Khlat | H01Q 3/267 320/108 |

* cited by examiner

ANTENNA ARRAY CALIBRATION FOR WIRELESS CHARGING

PRIORITY APPLICATIONS

This application claims the benefit of U.S. provisional patent application Nos. 62/024,621, filed Jul. 15, 2014; 62/024,628, filed Jul. 15, 2014; 62/051,023, filed Sep. 16, 2014; 62/052,517, filed Sep. 19, 2014; 62/053,845, filed Sep. 23, 2014; and 62/052,822, filed Sep. 19, 2014, which are incorporated herein by reference in their entireties.

FIELD OF THE DISCLOSURE

The technology of the disclosure relates generally to wireless charging of a battery.

BACKGROUND

Mobile communication devices have become increasingly common in current society. The prevalence of these mobile communication devices is driven in part by the many functions that are now enabled on such devices. Demand for such functions increases processing capability requirements for the mobile communication devices. As a result, increasingly complex integrated circuits (ICs) have been designed and manufactured to provide increasingly greater functionality in the mobile communication devices. However, the increasingly complex ICs also tend to consume more battery power during operation.

It has become more challenging to prolong battery life of the mobile communication devices in the face of continuing demand for higher processing speed, richer multimedia experience, and constant connectivity. As a result, the mobile communication devices are increasingly equipped with high-capacity batteries that are both expensive and space consuming. Even with the high-capacity batteries, the mobile communication devices often need to be plugged into the wall for recharging before the day is over.

SUMMARY

Aspects disclosed in the detailed description include antenna array calibration for wireless charging. In this regard, a wireless charging station is provided and configured to calibrate a plurality of antenna elements in the wireless charging station. In one aspect, an initial calibration sequence is performed each time the wireless charging station is powered on. The initial calibration sequence utilizes a reference antenna element, which is an antenna element randomly selected from the plurality of antenna elements, to determine relative receiver phase errors between the reference antenna element and each of the other antenna elements in the antenna array. In another aspect, a training sequence is performed after completing the initial calibration sequence. The training sequence utilizes a wireless training signal and the relative receiver phase errors obtained in the initial calibration sequence to determine total relative phase errors between the reference antenna element and each of the other antenna elements in the antenna array. Adjustments can then be made to match respective total relative phase errors among the plurality of antenna elements to achieve phase coherency among the plurality of antenna elements for improved wireless charging power efficiency.

In this regard, in one aspect, a wireless charging station is provided. The wireless charging station comprises a plurality of antenna elements. Each of the plurality of antenna elements comprises a receiver and a transmitter coupled to an antenna. Each of the plurality of antenna elements also comprises a phase shift circuitry coupled to the transmitter and configured to adjust transmitter phase of the transmitter. The wireless charging station also comprises a controller coupled to the plurality of antenna elements. The controller is configured to select a reference antenna element from the plurality of antenna elements wherein unselected ones of the plurality of antenna elements are non-reference antenna elements. For each of the non-reference antenna elements, the controller is configured to transmit a first calibration signal from a transmitter of the reference antenna element. For each of the non-reference antenna elements, the controller is also configured to measure phase $a_x$ of the first calibration signal at a receiver of the reference antenna element. For each of the non-reference antenna elements, the controller is also configured to measure phase $b_x$ of the first calibration signal at a receiver of a non-reference antenna element. For each of the non-reference antenna elements, the controller is also configured to transmit a second calibration signal from a transmitter of the non-reference antenna element. For each of the non-reference antenna elements, the controller is also configured to measure phase $a_y$ of the second calibration signal at the receiver of the non-reference antenna element. For each of the non-reference antenna elements, the controller is also configured to measure phase $b_y$ of the second calibration signal at the receiver of the reference antenna element (phase $b_y$). For each of the non-reference antenna elements, the controller is also configured to determine relative receiver phase error and relative transmitter phase error between the non-reference antenna element and the reference antenna element based on the phase $a_x$, the phase $a_y$, the phase $b_x$, and the phase $b_y$.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure and, together with the description, serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Aspects disclosed in the detailed description include antenna array calibration for wireless charging. In this regard, a method for calibrating a plurality of antenna elements of an antenna array in a wireless charging station is provided. In one aspect, an initial calibration sequence is performed each time the wireless charging station is powered on. The initial calibration sequence utilizes a reference antenna element, which is an antenna element randomly selected from the plurality of antenna elements, to determine relative receiver phase errors between the reference antenna element and each of the other antenna elements in the antenna array. In another aspect, a training sequence is performed after completing the initial calibration sequence. The training sequence utilizes a wireless training signal and the relative receiver phase errors obtained in the initial calibration sequence to determine total relative phase errors between the reference antenna element and each of the other antenna elements in the antenna array. Adjustments can then be made to match respective total relative phase errors among the plurality of antenna elements to achieve phase coherency among the plurality of antenna elements for improved wireless charging power efficiency.

Figure 1A:
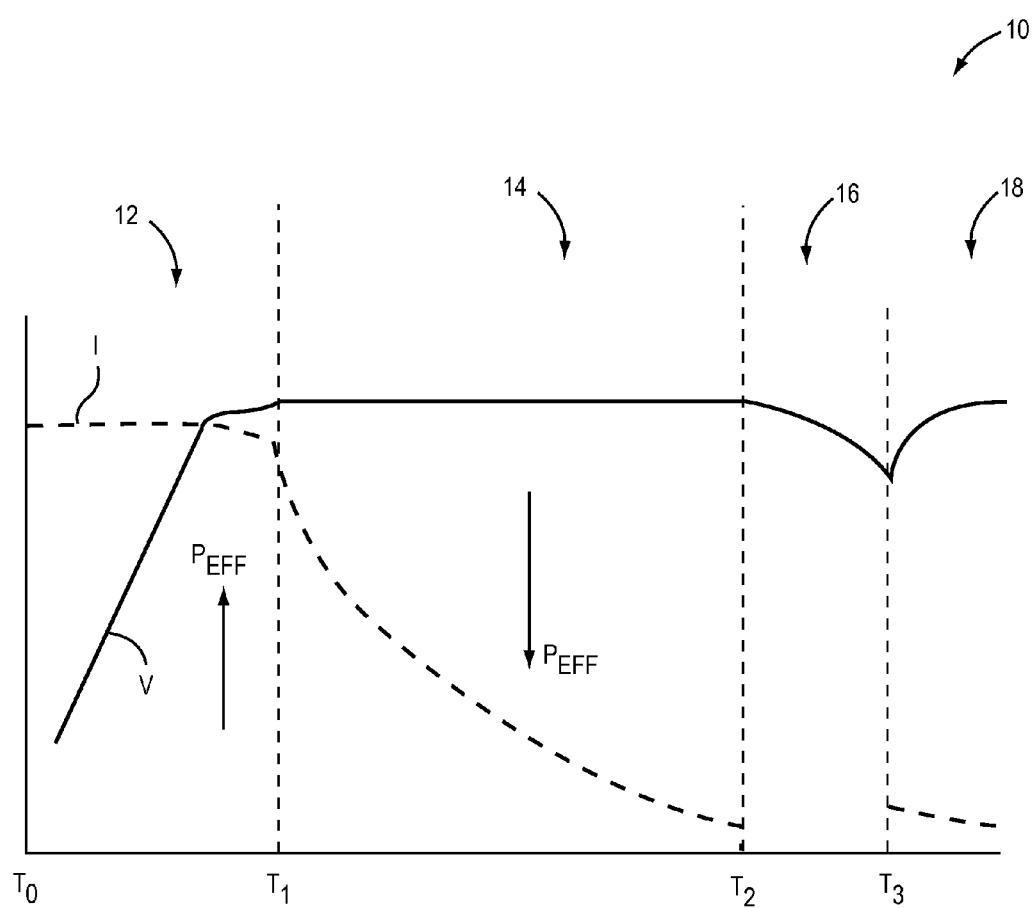
FIG. 1A is an exemplary illustration of a lithium-ion (Li-ion) battery charging profile.
Figure 1B:
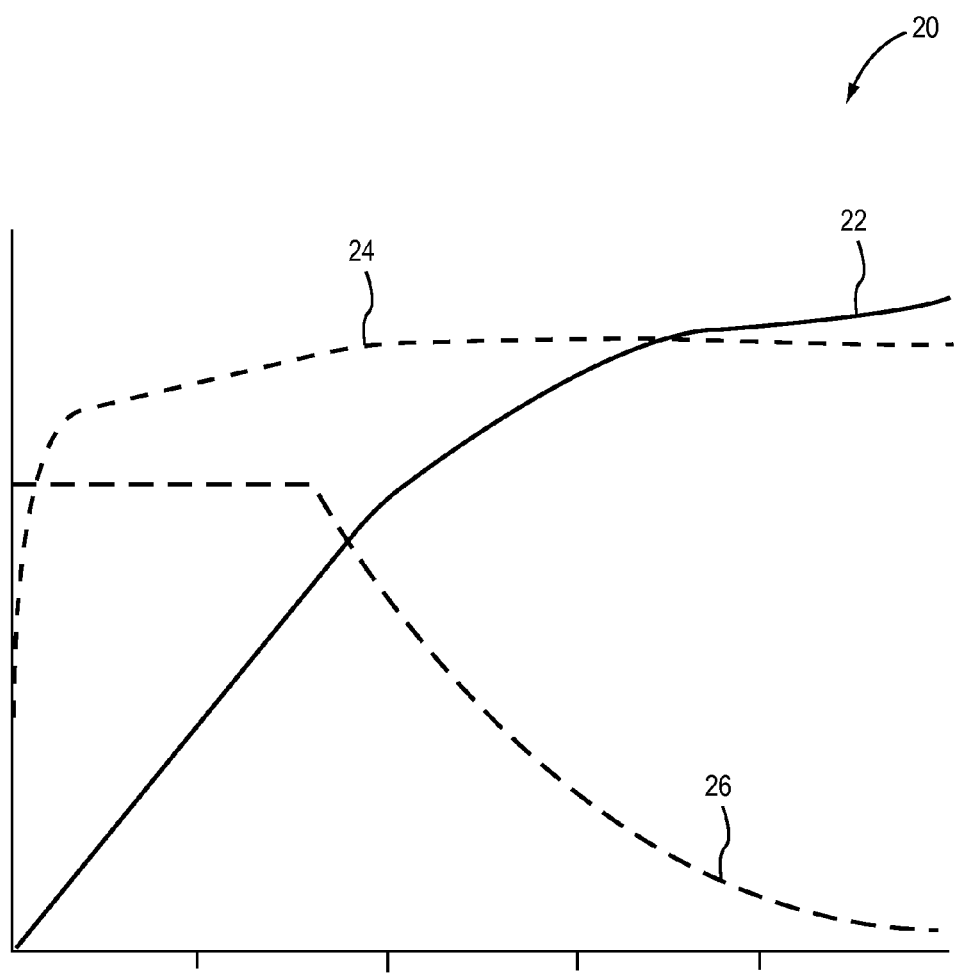
FIG. 1B is a capacity-voltage curve providing an exemplary illustration of Li-ion battery capacity as a function of a charging voltage and a charging current.

Before discussing the wireless charging concepts of the present disclosure, a brief overview of a lithium-ion (Li-ion) battery charging profile is provided with reference to FIGS. 1A and 1B. The discussion of specific exemplary aspects of wireless charging starts below with reference to FIG. 2.

In this regard, FIG. 1A is an exemplary illustration of a Li-ion battery charging profile 10. As is well known in the industry, a Li-ion battery (not shown) has strict requirements on charging voltage and charging current because Li-ion cells (not shown) in the Li-ion battery cannot accept overcharge. In this regard, the Li-ion battery can only take what it can absorb. Anything extra can cause stress and even permanent damage to the Li-ion battery.

When the Li-ion battery is connected to a charging source (not shown) at time $T_0$, the Li-ion battery is in a constant current stage 12, in which charging voltage (referenced in drawings as V) rises while charging current (referenced in drawings as I) remains constant. As such, an effective charging power (referenced in drawings as $P_{EFF}$) ($P_{EFF}=V\times I$) increases as a result of the charging voltage increase, thus enabling fast charging of the Li-ion battery. At time $T_1$, the Li-ion battery is in a saturation charge stage 14, in which the charging voltage peaks and levels off while the charging current starts to decline. As such, the effective charging power decreases as a result of the charging current decline. At time $T_2$, the Li-ion battery is in a ready stage 16, wherein the Li-ion battery is charged to a desired voltage level and the charging current drops to zero (0). In this regard, the effective charging power also drops to zero (0) to prevent overcharging damage to the Li-ion battery. At time $T_3$, the Li-ion battery is in a standby stage 18, in which the charging current may be applied occasionally to top the Li-ion battery up to the desired voltage level.

FIG. 1B is a capacity-voltage curve 20 providing an exemplary illustration of a Li-ion battery capacity as a function of the charging voltage and the charging current of FIG. 1A. The capacity-voltage curve 20 comprises a capacity curve 22, a charging voltage curve 24, and a charging current curve 26. When the Li-ion battery is connected to the charging source, the charging voltage curve 24 shoots up quickly. In this regard, the Li-ion battery is in the constant current stage 12 according to the Li-ion battery charging profile 10 of FIG. 1A. As the capacity curve 22 gradually peaks, the charging current curve 26 declines quickly and the charging voltage curve 24 levels off. In this regard, the Li-ion battery is in the saturation charge stage 14 according to the Li-ion battery charging profile 10. Since the Li-ion battery cannot accept overcharge, the charging current must be cut off. A continuous trickle charge (maintenance charge) would cause plating of metallic lithium, thus compromising safety of the Li-ion battery. Hence, according to the Li-ion battery charging profile 10 and the capacity-voltage curve 20, the effective charging power increases when the Li-ion battery is in the constant current stage 12 and decreases when the Li-ion battery is in the saturation charge stage 14 to ensure fast charging and protect the Li-ion battery from overcharging damage.

The Li-ion battery has become increasingly popular in battery-operated electronic devices, such as smartphones, tablets, and portable computers, due to many advantages over traditional batteries (e.g., nickel-cadmium batteries). For example, the Li-ion battery has higher power density, produces less self-discharge, and requires lower maintenance to prolong battery life than the traditional batteries. Concurrent to the prevalence of Li-ion battery technology, wireless charging is also gaining traction in the wireless communication industry and may one day replace charging plugs and wires, similar to how Bluetooth™ and wireless-fidelity (Wi-Fi) have eliminated communication cables (e.g., Ethernet cables) in peer-to-peer and peer-to-multi-peer communications.

Figure 2:
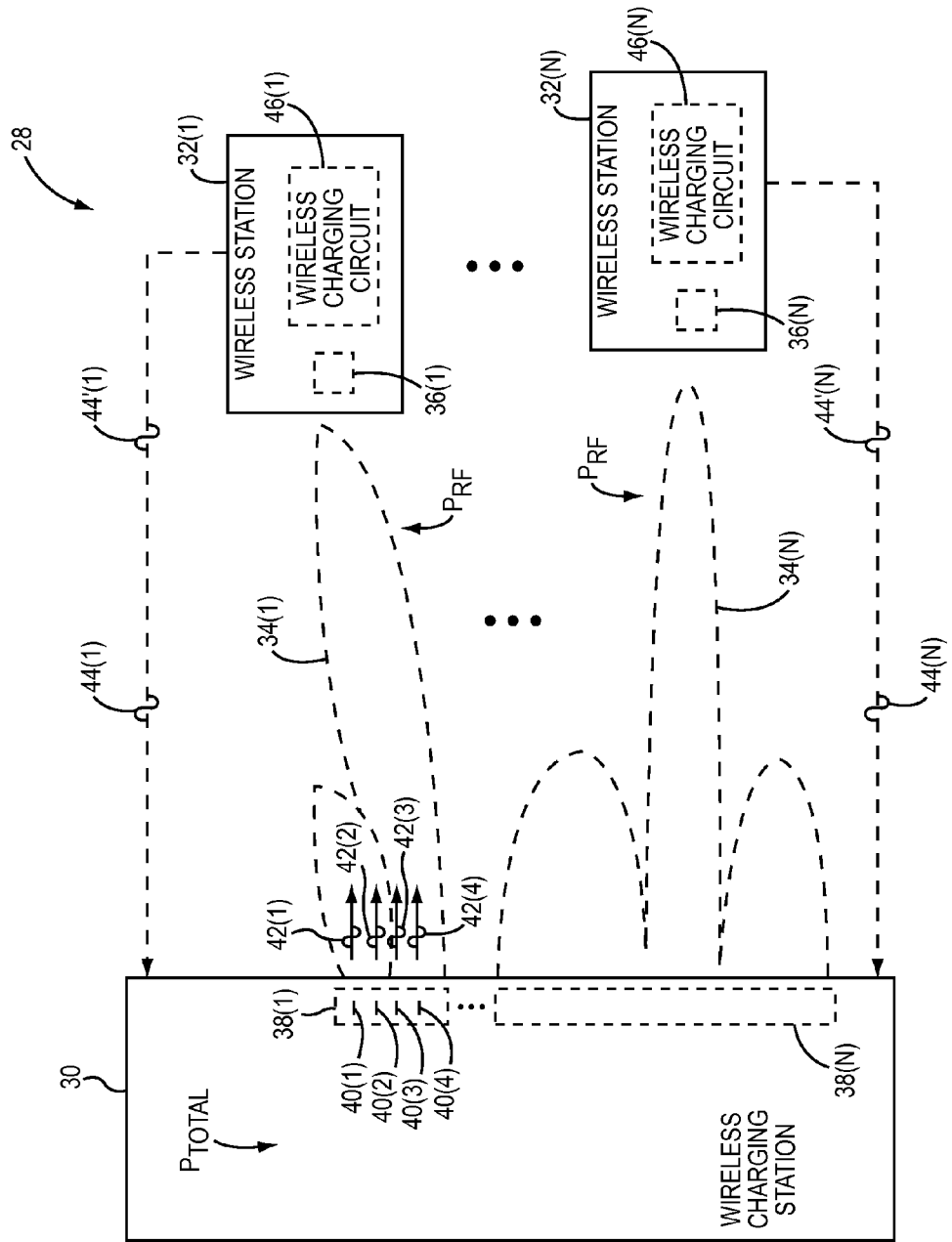
FIG. 2 is a schematic diagram of an exemplary wireless charging system, in which a wireless charging station is configured to charge one or more wireless stations via one or more respective wireless radio frequency (RF) charging signals.

In this regard, FIG. 2 is a schematic diagram of an exemplary wireless charging system 28, wherein a wireless charging station 30 is configured to charge one or more wireless stations 32(1)-32(N) via one or more respective wireless RF charging signals 34(1)-34(N). The one or more wireless stations 32(1)-32(N) include one or more respective batteries 36(1)-36(N). In a non-limiting example, the one or more batteries 36(1)-36(N) are Li-ion batteries. In this regard, the Li-ion battery charging profile 10 of FIG. 1A and the capacity-voltage curve 20 of FIG. 1B are applicable when charging the one or more batteries 36(1)-36(N) in the wireless charging system 28. In another non-limiting example, the one or more wireless RF charging signals 34(1)-34(N) are provided on an industrial, scientific, and medical (ISM) band that may operate in nine hundred fifteen megahertz (915 MHz), twenty-four hundred megahertz (2400 MHz), fifty-eight hundred megahertz (5800 MHz), or twenty-four gigahertz (24 GHz) RF spectrums.

The wireless charging station 30 has a total available power (referenced in drawings as $P_{TOTAL}$), which must be set below a maximum power (not shown) that is set by regulatory authorities such as the Federal Communications Commission (FCC) in the United States. The total available power is shared among the one or more wireless stations 32(1)-32(N). The wireless charging station 30 dynamically determines how the total available power is distributed among the one or more wireless stations 32(1)-32(N). In this regard, the more wireless stations that are in the wireless charging system 28, the smaller share of the total available power each wireless station will receive.

With continuing reference to FIG. 2, the wireless charging station 30 includes a plurality of antenna elements (not shown). In a non-limiting example, the wireless charging station 30 can have in excess of ten thousand (10,000) antenna elements. The plurality of antenna elements in the wireless charging station 30 may be further configured to form one or more antenna arrays 38(1)-38(N), in which each of the one or more antenna arrays 38(1)-38(N) includes at least two antenna elements among the plurality of antenna elements of the wireless charging station 30. The one or more antenna arrays 38(1)-38(N) are configured to transmit the one more wireless RF charging signals 34(1)-34(N) to the one or more wireless stations 32(1)-32(N), respectively. To illustrate the configuration and operation of the wireless charging system 28, wireless station 32(1), wireless RF charging signal 34(1), and antenna array 38(1) are discussed as a non-limiting example. It should be understood that the configuration and operation discussed herein are applicable to the one or more antenna arrays 38(1)-38(N), the one or more wireless RF charging signals 34(1)-34(N), and the one or more wireless stations 32(1)-32(N) as well.

If, for example, the antenna array 38(1) includes four antenna elements 40(1)-40(4), the wireless RF charging signal 34(1) will include four RF signals 42(1)-42(4) transmitted from the four antenna elements 40(1)-40(4), respectively. In this regard, the wireless RF charging signal 34(1) is a beamformed wireless RF charging signal. Beamforming is a modern wireless signal transmission scheme, in which multiple wireless signals, such as the four RF signals 42(1)-42(4), are transmitted simultaneously toward a single wireless receiver. If phases of the multiple wireless signals are coherent, the wireless receiver will be able to linearly combine the multiple wireless signals for improved signal strength and power gain.

Since the four RF signals 42(1)-42(4) may arrive at the wireless station 32(1) through different paths, the four antenna elements 40(1)-40(4) in the antenna array 38(1) are calibrated to ensure phase coherence when the four RF signals 42(1)-42(4) arrive at the wireless station 32(1). By having the phase coherence among the four RF signals 42(1)-42(4), a total RF power (referenced in drawings as $P_{RF}$) of the wireless RF charging signal 34(1) can be linearly controlled by adjusting individual RF power of the four RF signals 42(1)-42(N). Hence, the total RF power of the wireless RF charging signal 34(1) can be maximized.

If the antenna array 38(1) and the wireless station 32(1) are disposed in a line-of-sight (LOS) arrangement, transmitter phases and amplitudes of the four RF signals 42(1)-42(4) can be estimated based on a training signal (not shown) provided by the wireless station 32(1) under the assumption that the training signal would have a high degree of phase correlation with the wireless RF charging signal 34(1). However, this may not always be the case in the wireless charging system 28 because the antenna array 38(1) and the wireless station 32(1) may not always be disposed in the LOS arrangement. When the antenna array 38(1) and the wireless station 32(1) are not disposed in the LOS arrangement, the estimated transmitter phases and amplitudes based on the training signal may be inaccurate. As a result, it may be more difficult to preserve phase coherence among the four RF signals 42(1)-42(4) and control the total RF power in the wireless RF charging signal 34(1). Consequently, it is also difficult for the wireless charging station 30 to control the effective charging power according to the Li-ion battery charging profile 10 of FIG. 1A since the effective charging power is proportionally related to the total RF power. In this regard, one or more battery charging signal indications (BCSIs) 44(1)-44(N) are provided by one or more wireless charging circuits 46(1)-46(N) in the one or more wireless stations 32(1)-32(N), respectively, to help control the effective charging power according to the Li-ion battery charging profile 10.

For example, BCSI 44(1) provided by the wireless station 32(1) indicates a difference between the effective charging power being provided to battery 36(1) and a target charging power determined based on the Li-ion battery charging profile 10 of FIG. 1A. In a non-limiting example, the BCSI 44(1) is set to zero (0) when the effective charging power is greater than the target charging power to request a decrease of the total RF power in the wireless RF charging signal 34(1). In another non-limiting example, the BCSI 44(1) is set to one (1) when the effective charging power is less than the target charging power to request an increase of the total RF power in the wireless RF charging signal 34(1). Upon receiving the BCSI 44(1), the wireless charging station 30 adjusts the individual RF power of the four RF signals 42(1)-42(4) accordingly. For example, the wireless charging station 30 can decrease the individual RF power of the four RF signals 42(1)-42(4) if the BCSI 44(1) is set to zero (0), or increase the individual RF power of the four RF signals 42(1)-42(4) when the BCSI 44(1) is set to one (1). Hence, by providing the BCSI 44(1) to the wireless charging station 30 continuously, or according to a predefined feedback schedule, the effective charging power provided to the battery 36(1) can be gradually adjusted to eventually match the target charging power.

In addition to providing the one or more BCSIs 44(1)-44(N), the one or more wireless stations 32(1)-32(N) may be configured to provide one or more BCSI resolution (BCSIr) signals 44'(1)-44'(N). The one or more BCSIr signals 44'(1)-44'(N) indicate one or more power differentials between one or more effective charging powers provided to the one or more batteries 36(1)-36(N) and one or more target charging powers required by the one or more batteries 36(1)-36(N), respectively.

As mentioned earlier, if phases of the multiple wireless signals, such as the four RF signals 42(1)-42(4) transmitted by the antenna array 38(1), are coherent, the wireless receiver at the wireless station 32(1) will be able to linearly combine the multiple wireless signals for improved signal strength and power gain. To further illustrate how the wireless charging station 30 may be configured to transmit coherently the one more wireless RF charging signals 34(1)-34(N), FIG. 3 is a schematic diagram of an exemplary wireless charging station 48 including a plurality of antenna elements 50(1)-50(M) that may be calibrated to achieve phase coherency when transmitting the one or more wireless RF charging signals 34(1)-34(N) of FIG. 2.

Figure 3:
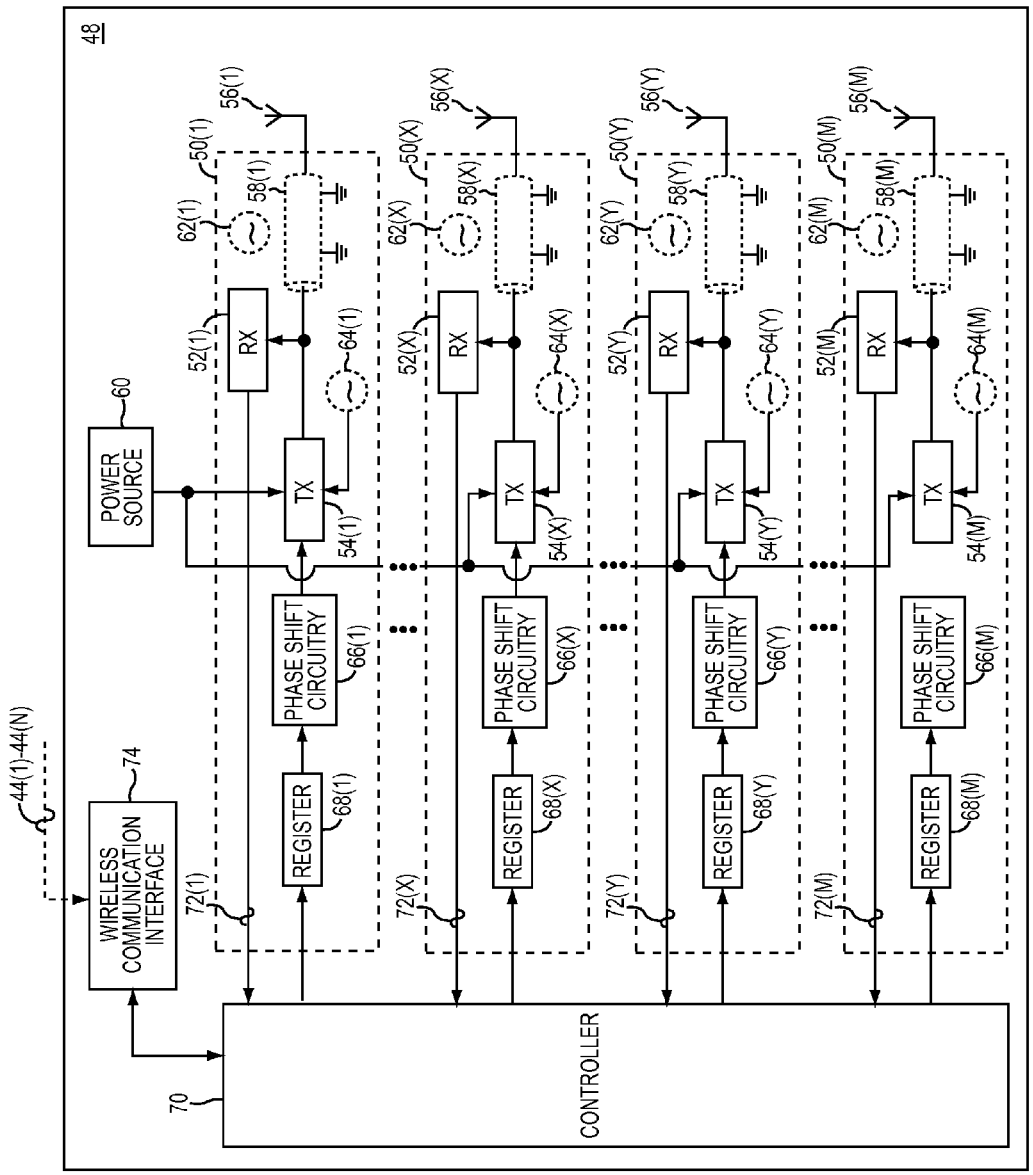
FIG. 3 is a schematic diagram of an exemplary wireless charging station including a plurality of antenna elements that may be calibrated to achieve phase coherency when transmitting the one or more wireless RF charging signals of FIG. 2.

With reference to FIG. 3, the plurality of antenna elements 50(1)-50(M) respectively include a plurality of receivers 52(1)-52(M) and a plurality of transmitters 54(1)-54(M). The plurality of receivers 52(1)-52(M) and the plurality of transmitters 54(1)-54(M) are respectively coupled to a plurality of antennas 56(1)-56(M) via a plurality of signal paths 58(1)-58(M). In a non-limiting example, the plurality of signal paths 58(1)-58(M) may be provided as coaxial cables. The plurality of transmitters 54(1)-54(M) may be powered by a power source 60. The plurality of receivers 52(1)-52(M) is coupled to a plurality of receiver oscillators 62(1)-62(M) that determines operation frequency of the plurality of receivers 52(1)-52(M), respectively. The plurality of transmitters 54(1)-54(M) is coupled to a plurality of transmitter oscillators 64(1)-64(M) that determines operation frequency of the plurality of transmitters 54(1)-54(M), respectively.

The plurality of antenna elements 50(1)-50(M) comprises a plurality of phase shift circuitries 66(1)-66(M), respectively. The plurality of phase shift circuitries 66(1)-66(M) is coupled to the plurality of transmitters 54(1)-54(M) and configured to adjust transmitter phases of the plurality of transmitters 54(1)-54(M), respectively. The plurality of antenna elements 50(1)-50(M) also comprises a plurality of registers 68(1)-68(M), respectively. The plurality of registers 68(1)-68(M) is coupled to the plurality of phase shift circuitries 66(1)-66(M) and configured to store the transmitter phases of the plurality of transmitters 54(1)-54(M), respectively, after being adjusted by the plurality of phase shift circuitries 66(1)-66(M).

The wireless charging station 48 comprises a controller 70 coupled to the plurality of receivers 52(1)-52(M) and the plurality of transmitters 54(1)-54(M). As is further discussed later with reference to FIGS. 4-9, the controller 70 is configured to collect a plurality of feedback information 72(1)-72(M) from the plurality of receivers 52(1)-52(M), respectively. The controller 70 then controls the plurality of phase shift circuitries 66(1)-66(M) to adjust the transmitter phases of the plurality of transmitters 54(1)-54(M) based on the plurality of feedback information 72(1)-72(M), respectively.

The wireless charging station 48 also comprises a wireless communication interface 74, which may be configured to receive the one or more BCSIs 44(1)-44(N) and the one or more BCSIr signals 44'(1)-44'(N) of FIG. 2. In a non-limiting example, the wireless communication interface 74 may be configured to operate based on Wi-Fi, Bluetooth, Bluetooth Low Energy (BLE), and ZigBee communication protocols.

When the wireless charging station 48 is powered on, the transmitter phases of the plurality of antenna elements 50(1)-50(M) may be out of alignment and become incoherent because relative phases of the plurality of transmitter oscillators 64(1)-64(M) may be randomized at the power on event. Furthermore, impedance variations among the plurality of signal paths 58(1)-58(M) may also cause the plurality of antenna elements 50(1)-50(M) to lose phase coherency during transmission. As such, it is necessary to calibrate the plurality of antenna elements 50(1)-50(M) to ensure phase coherency after power-up of the wireless charging station 48.

Calibrations for the plurality of antenna elements 50(1)-50(M) may be conducted in several steps. In a first step (hereinafter referred to as "initial calibration sequence"), relative transmitter phase error and relative receiver phase error is determined between each pair of antenna elements among the plurality of antenna elements 50(1)-50(M). The initial calibration sequence may be conducted with three different configurations, which will be discussed with reference to FIGS. 4-6. After completing the initial calibration sequence, a second step (hereinafter referred to as "training sequence") may be conducted to further determine total relative phase error between each pair of antenna elements among the plurality of antenna elements 50(1)-50(M). The training sequence is illustrated and discussed with reference to FIG. 7. Subsequently, a third step (hereinafter referred to as "validation sequence") may be performed to validate phase coherency among the plurality of antenna elements 50(1)-50(M). In a non-limiting example, the validation sequence may be performed after the initial calibration sequence and/or after the training sequence. The validation sequence is illustrated and discussed with reference to FIG. 8.

Figure 4:
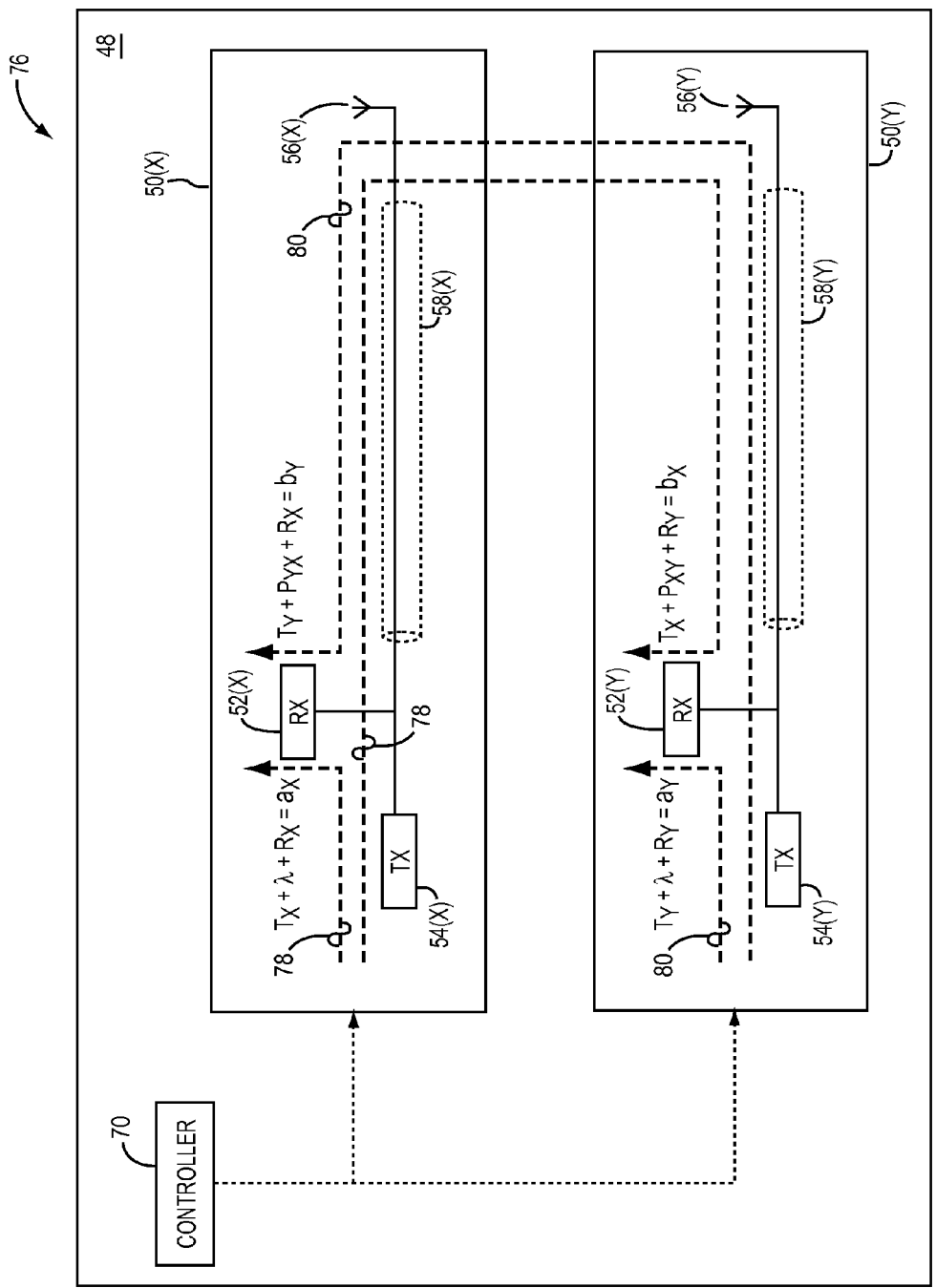
FIG. 4 is a schematic diagram of an exemplary first configuration for performing an initial calibration sequence among the plurality of antenna elements of FIG. 3.

In this regard, FIG. 4 is a schematic diagram of an exemplary first configuration 76 for performing the initial calibration sequence among the plurality of antenna elements 50(1)-50(M) of FIG. 3. Common elements between FIGS. 3 and 4 are shown therein with common element numbers and will not be re-described herein.

With reference to FIG. 4, to determine the relative transmitter phase error and the relative receiver phase error between each pair of antenna elements among the plurality of antenna elements 50(1)-50(M), the controller 70 designates an antenna element selected randomly from the plurality of antenna elements 50(1)-50(M) as a reference antenna element. The controller 70 then determines the relative transmitter phase error and the relative receiver phase error between the reference antenna element and each of the antenna elements among the plurality of antenna elements 50(1)-50(M) not designated as the reference antenna element (non-reference antenna element). For the convenience of discussion, antenna element 50(X) and antenna element 50(Y), which may be any of the plurality of antenna elements 50(1)-50(M), are discussed hereinafter in FIGS. 4-7 as the reference antenna element and the non-reference antenna element, respectively. It should be understood that the configuration and operation discussed in connection to the antenna element 50(X) and the antenna element 50(Y) are applicable to all of the plurality of antenna elements 50(1)-50(M).

In a non-limiting example, the controller 70 may be configured to perform the initial calibration sequence according to the first configuration 76. The controller 70 instructs the reference antenna element 50(X) to transmit a first calibration signal 78 from respective transmitter 54(X) of the reference antenna element 50(X). The reference antenna element 50(X) and the non-reference antenna element 50(Y) receive the first calibration signal 78 at respective receiver 52(X) and respective receiver 52(Y). The controller 70 measures a respective phase of the first calibration signal 78 at the receiver 52(X) (phase $a_x$) and at the receiver 52(Y) (phase $b_x$). The phase $a_x$ and the phase $b_x$ are both compounded by multiple factors that can be respectively expressed by equations Eq. 1 and Eq. 2 below.

$$\text{phase } a_x = T_X + \lambda + R_X \quad \text{(Eq. 1)}$$

$$\text{phase } b_x = T_X + P_{XY} + R_Y \quad \text{(Eq. 2)}$$

With reference to the equations Eq. 1 and Eq. 2, $T_X$ represents a phase shift associated with the transmitter 54(X) of the reference antenna element 50(X). $R_X$ represents a phase shift associated with the receiver 52(X) of the reference antenna element 50(X). $\lambda$ represents a phase shift associated with coupling the receiver 52(X) of the reference antenna element 50(X) to the transmitter 54(X) of the reference antenna element 50(X). $R_Y$ represents a phase shift associated with the receiver 52(Y) of the non-reference antenna element 50(Y). $P_{XY}$ represents a phase shift associated with signal path 58(X) and signal path 58(Y) that convey the first calibration signal 78 from the transmitter 54(X) of the reference antenna element 50(X) to the receiver 52(Y) of the non-reference antenna element 50(Y).

Subsequently, the controller 70 instructs the non-reference antenna element 50(Y) to transmit a second calibration signal 80 from respective transmitter 54(Y) of the non-reference antenna element 50(Y). In a non-limiting example, the non-reference antenna element 50(Y) may be instructed to transmit the second calibration signal 80 at a same frequency as the first calibration signal 78 or at a different frequency from the first calibration signal 78. The reference antenna element 50(X) and the non-reference antenna element 50(Y) receive the second calibration signal 80 at the respective receiver 52(X) and the respective receiver 52(Y). The controller 70 then measures a respective phase of the second calibration signal 80 at the receiver 52(X) (phase $b_y$) and at the receiver 52(Y) (phase $a_y$). The phase $a_y$ and the phase $b_y$ are both compounded by multiple factors that can be respectively expressed by equations Eq. 3 and Eq. 4 below.

$$\text{phase } a_y = T_Y + \lambda + R_Y \qquad (\text{Eq. 3})$$

$$\text{phase } b_y = T_Y + P_{YX} + R_X \qquad (\text{Eq. 4})$$

With reference to the equations Eq. 3 and Eq. 4, $T_Y$ represents a phase shift associated with the transmitter 54(Y) of the non-reference antenna element 50(Y). $R_Y$ represents a phase shift associated with the receiver 52(Y) of the non-reference antenna element 50(Y). $\lambda$ represents a phase shift associated with coupling the receiver 52(Y) of the non-reference antenna element 50(Y) to the transmitter 54(Y) of the non-reference antenna element 50(Y). $R_X$ represents a phase shift associated with the receiver 52(X) of the reference antenna element 50(X). $P_{YX}$ represents a phase shift associated with the signal path 58(Y) and the signal path 58(X) that convey the second calibration signal 80 from the transmitter 54(Y) of the non-reference antenna element 50(Y) to the receiver 52(X) of the reference antenna element 50(X).

As previously mentioned, the purpose of the initial calibration sequence is to determine the relative transmitter phase error and the relative receiver phase error among the plurality of antenna elements 50(1)-50(M). In this regard, the relative transmitter phase error and the relative receiver phase error between the non-reference antenna element 50(Y) and the reference antenna element 50(X) can be determined by equations Eq. 5 and Eq. 6 below.

$$\text{relative transmitter phase error} = T_Y - T_X \qquad (\text{Eq. 5})$$

$$\text{relative receiver phase error} = R_Y - R_X \qquad (\text{Eq. 6})$$

Assuming that $P_{XY}$ and $P_{YX}$ are equal, the equations Eq. 5 and Eq. 6 can be transformed to the following equations Eq. 7 and Eq. 8, respectively, based on the equations Eq. 1, Eq. 2, Eq. 3, and Eq. 4.

$$T_Y - T_X = [(a_y - a_x) + (b_y - b_x)]/2 \qquad (\text{Eq. 7})$$

$$R_Y - R_X = [(a_y - a_x) - (b_y - b_x)]/2 \qquad (\text{Eq. 8})$$

Hence, the relative transmitter phase error ($T_Y - T_X$) and the relative receiver phase error ($R_Y - R_X$) can be determined based on the phase $a_x$, the phase $a_y$, the phase $b_x$, and the phase $b_y$ that are measured by the controller 70 during the initial calibration sequence.

Figure 5:
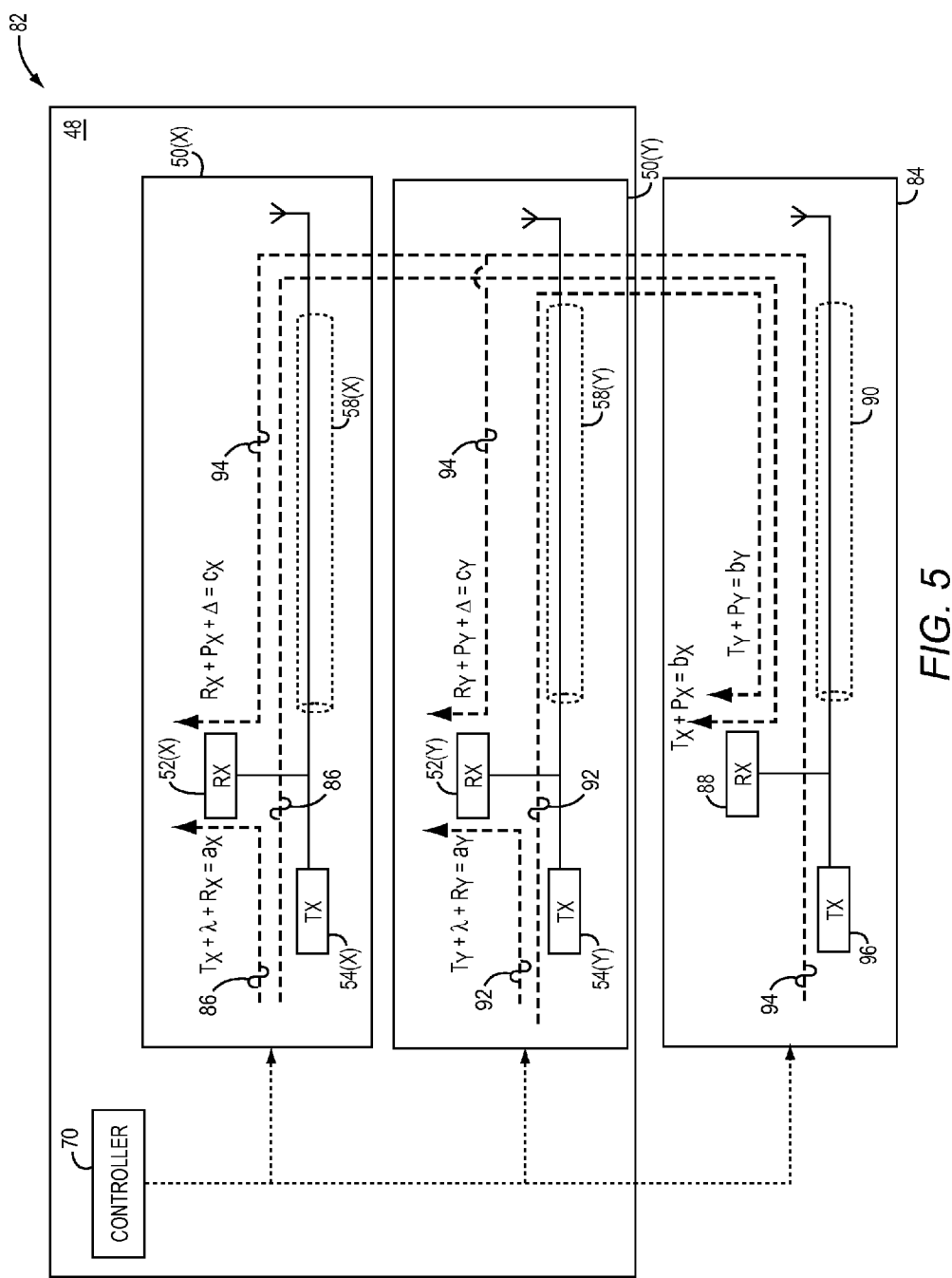
FIG. 5 is a schematic diagram of an exemplary second configuration for performing an initial calibration sequence among the plurality of antenna elements of FIG. 3.

FIG. 5 is a schematic diagram of an exemplary second configuration 82 for performing the initial calibration sequence among the plurality of antenna elements 50(1)-50(M) of FIG. 3. Common elements between FIGS. 3, 4, and 5 are shown therein with common element numbers and will not be re-described herein.

To perform the initial calibration sequence based on the second configuration 82, a calibration antenna element 84, which is identical to the plurality of antenna elements 50(1)-50(M), is provided in the wireless charging station 48. The controller 70 instructs the reference antenna element 50(X) to transmit a first calibration signal 86 from the transmitter 54(X) of the reference antenna element 50(X). The reference antenna element 50(X) and the calibration antenna element 84 receive the first calibration signal 86 at the respective receiver 52(X) and a calibration receiver 88. The controller 70 then measures a respective phase of the first calibration signal 86 at the respective receiver 52(X) (phase $a_x$) and at the calibration receiver 88 (phase $b_x$). The phase $a_x$ and the phase $b_x$ are both compounded by multiple factors that can be respectively expressed by equations Eq. 9 and Eq. 10 below.

$$\text{phase } a_x = T_X + \lambda + R_X \qquad (\text{Eq. 9})$$

$$\text{phase } b_x = T_X + P_X \qquad (\text{Eq. 10})$$

With reference to the equations Eq. 9 and Eq. 10, $T_X$ represents a phase shift associated with the transmitter 54(X) of the reference antenna element 50(X). $R_X$ represents a phase shift associated with the receiver 52(X) of the reference antenna element 50(X). $\lambda$ represents a phase shift associated with coupling respective receiver 52(X) of the reference antenna element 50(X) to the transmitter 54(X) of the reference antenna element 50(X). $P_X$ represents a phase shift associated with the signal path 58(X) and a signal path 90 in the calibration antenna element 84 that convey the first calibration signal 86 from the transmitter 54(X) of the reference antenna element 50(X) to the calibration receiver 88 of the calibration antenna element 84.

Next, the controller 70 instructs the non-reference antenna element 50(Y) to transmit a second calibration signal 92 from the respective transmitter 54(Y) of the non-reference antenna element 50(Y). The non-reference antenna element 50(Y) and the calibration antenna element 84 receive the second calibration signal 92 at the respective receiver 52(Y) and the calibration receiver 88. The controller 70 then measures a respective phase of the second calibration signal 92 at the respective receiver 52(Y) (phase $a_y$) and at the calibration receiver 88 (phase $b_y$). The phase $a_y$ and the phase $b_y$ are both compounded by multiple factors that can be respectively expressed by equations Eq. 11 and Eq. 12 below.

$$\text{phase } a_y = T_Y + \lambda + R_Y \qquad (\text{Eq. 11})$$

$$\text{phase } b_y = T_Y + P_Y \qquad (\text{Eq. 12})$$

With reference to the equations Eq. 11 and Eq. 12, $T_Y$ represents a phase shift associated with the transmitter 54(Y) of the non-reference antenna element 50(Y). $R_Y$ represents a phase shift associated with the receiver 52(Y) of the non-reference antenna element 50(Y). $\lambda$ represents a phase shift associated with coupling the receiver 52(Y) of the non-reference antenna element 50(Y) to the transmitter 54(Y) of the non-reference antenna element 50(Y). $P_Y$ represents a phase shift associated with the signal path 58(Y) and the signal path 90 in the calibration antenna element 84 that convey the second calibration signal 92 from the transmitter 54(Y) of the non-reference antenna element 50(Y) to the calibration receiver 88 of the calibration antenna element 84.

Subsequently, the controller 70 instructs the calibration antenna element 84 to transmit a third calibration signal 94 from a calibration transmitter 96 of the calibration antenna element 84. The receiver 52(X) of the reference antenna element 50(X) and the receiver 52(Y) of the non-reference antenna element 50(Y) receive the third calibration signal 94. The controller 70 then measures a respective phase of the third calibration signal 94 at the receiver 52(X) (phase $c_x$) and at the receiver 52(Y) (phase $c_y$). The phase $c_x$ and the phase $c_y$ are compounded by multiple factors that can be respectively expressed by equations Eq. 13 and Eq. 14 below.

$$\text{phase } c_x = R_X + \Delta + P_X \quad \text{(Eq. 13)}$$

$$\text{phase } c_y = R_Y + \Delta + P_Y \quad \text{(Eq. 14)}$$

With reference to the equations Eq. 13 and Eq. 14, $\Delta$ represents a phase differential between the calibration transmitter 96 and the calibration receiver 88 of the calibration antenna element 84.

Accordingly, the relative receiver phase error ($R_Y - R_X$) between the non-reference antenna element 50(Y) and the reference antenna element 50(X) can be determined based on the equations Eq. 9-14 and expressed by the equation (Eq. 15) below.

$$R_Y - R_X = [(c_y - b_y + a_y) - (c_x - b_x + a_x)]/2 \quad \text{(Eq. 15)}$$

Hence, the relative receiver phase error ($R_Y - R_X$) can be determined based on the phase $a_x$, the phase $a_y$, the phase $b_x$, the phase $b_y$, the phase $c_x$, and the phase $c_y$ that are measured by the controller 70 during the initial calibration sequence.

Figure 6:
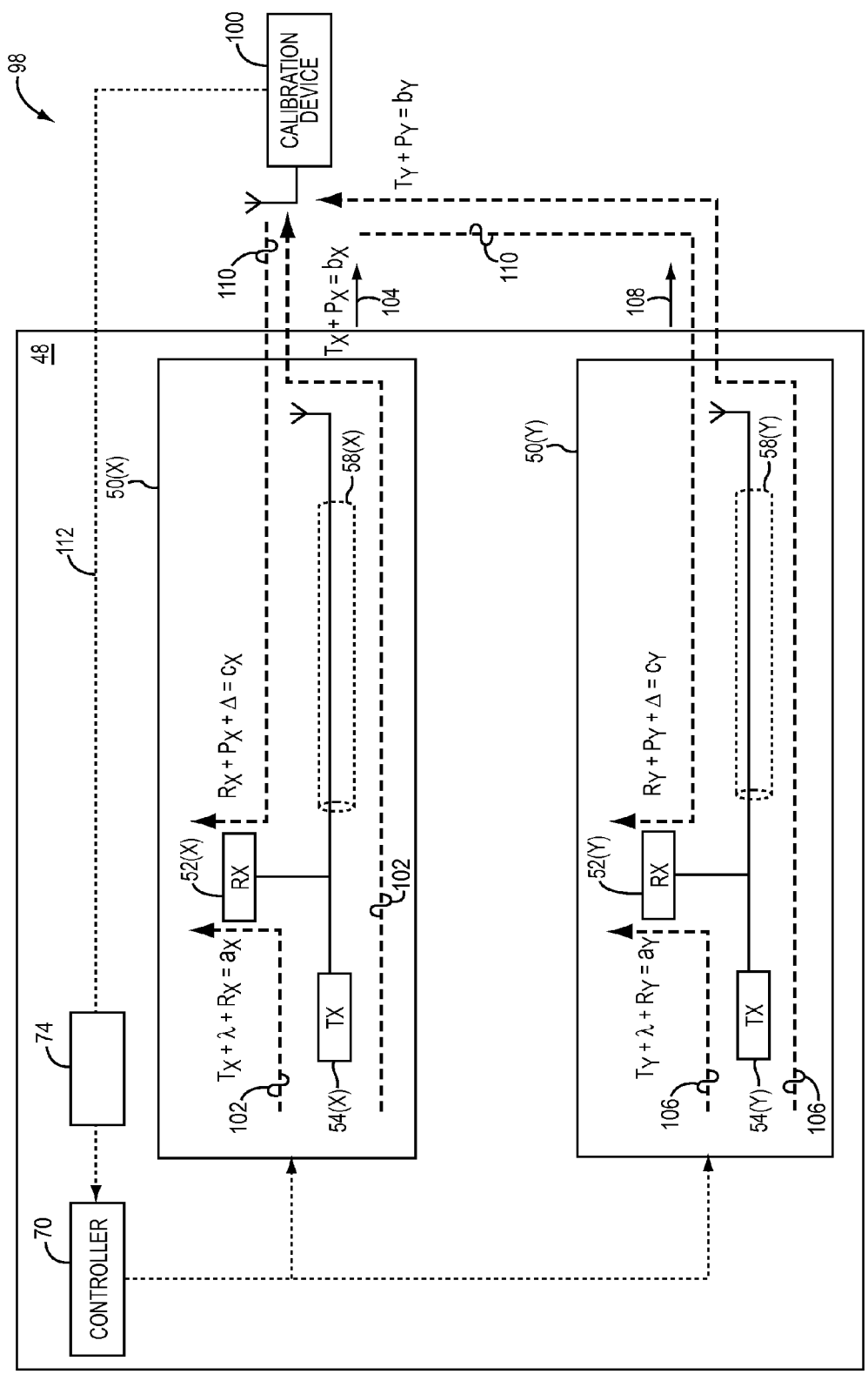
FIG. 6 is a schematic diagram of an exemplary third configuration for performing an initial calibration sequence among the plurality of antenna elements of FIG. 3.

FIG. 6 is a schematic diagram of an exemplary third configuration 98 for performing the initial calibration sequence among the plurality of antenna elements 50(1)-50(M) of FIG. 3. Common elements between FIGS. 3, 4, 5, and 6 are shown therein with common element numbers and will not be re-described herein.

To perform the initial calibration sequence based on the third configuration 98, a calibration device 100 is provided outside the wireless charging station 48. The controller 70 instructs the reference antenna element 50(X) to transmit a first calibration signal 102 from the transmitter 54(X) of the reference antenna element 50(X). The receiver 52(X) of the reference antenna element 50(X) and a receiver (not shown) of the calibration device 100 receive the first calibration signal 102. The controller 70 then measures a respective phase of the first calibration signal 102 at the receiver 52(X) (phase $a_x$) and at the receiver of the calibration device 100 (phase $b_x$). The phase $a_x$ and the phase $b_x$ are both compounded by multiple factors that can be respectively expressed by equations Eq. 16 and Eq. 17 below.

$$\text{phase } a_x = T_X + \lambda + R_X \quad \text{(Eq. 16)}$$

$$\text{phase } b_x = T_X + P_X \quad \text{(Eq. 17)}$$

With reference to the equations Eq. 16 and Eq. 17, $P_X$ represents a multipath phase shift associated with the signal path 58(X) and a wireless path 104 to the calibration device 100 that convey the first calibration signal 102 from the transmitter 54(X) of the reference antenna element 50(X) to the receiver of the calibration device 100.

Next, the controller 70 instructs the non-reference antenna element 50(Y) to transmit a second calibration signal 106 from the transmitter 54(Y) of the non-reference antenna element 50(Y). The receiver 52(Y) of the non-reference antenna element 50(Y) and the receiver of the calibration device 100 receive the second calibration signal 106. The controller 70 then measures a respective phase of the second calibration signal 106 at the receiver 52(Y) (phase $a_y$) and at the receiver of the calibration device 100 (phase $b_y$). The phase $a_y$ and the phase $b_y$ are both compounded by multiple factors that can be respectively expressed by equations Eq. 18 and Eq. 19 below.

$$\text{phase } a_y = T_Y + \lambda + R_Y \quad \text{(Eq. 18)}$$

$$\text{phase } b_y = T_Y + P_Y \quad \text{(Eq. 19)}$$

With reference to the equations Eq. 18 and Eq. 19, $P_Y$ represents a multipath phase shift associated with the signal path 58(Y) and a wireless path 108 to the calibration device 100 that convey the second calibration signal 106 from the transmitter 54(Y) of the non-reference antenna element 50(Y) to the receiver of the calibration device 100.

Subsequently, a third calibration signal 110 is transmitted from a transmitter (not shown) of the calibration device 100. The receiver 52(X) of the reference antenna element 50(X) and the receiver 52(Y) of the non-reference antenna element 50(Y) receive the third calibration signal 110. The controller 70 measures a respective phase of the third calibration signal 110 at the receiver 52(X) (phase $c_x$) and at the receiver 52(Y) (phase $c_y$). The phase $c_x$ and the phase $c_y$ are compounded by multiple factors that can be expressed by equations Eq. 20 and Eq. 21 below.

$$\text{phase } c_x = R_X + \Delta + P_X \quad \text{(Eq. 20)}$$

$$\text{phase } c_y = R_Y + \Delta + P_Y \quad \text{(Eq. 21)}$$

With reference to the equations Eq. 20 and Eq. 21, $\Delta$ represents a phase differential between the transmitter and the receiver of the calibration device 100.

The calibration device 100 may communicate the phase $b_x$ and the phase $b_y$ to the controller 70 via a wireless link 112. In a non-limiting example, the wireless link 112 operates in one of the ISM bands. In another non-limiting example, the wireless link 112 may operate based on Wi-Fi, Bluetooth, BLE, and ZigBee communication protocols. In another non-limiting example, the wireless link 112 may be established between the calibration device 100 and the wireless communication interface 74 in the wireless charging station 48.

Accordingly, the relative receiver phase error ($R_Y - R_X$) between the non-reference antenna element 50(Y) and the reference antenna element 50(X) can be determined based on the equations Eq. 16-21 and expressed by equation Eq. 22 below.

$$R_Y - R_X = [(c_y - b_y + a_y) - (c_x - b_x + a_x)]/2 \quad \text{(Eq. 22)}$$

Hence, the relative receiver phase error ($R_Y - R_X$) can be determined based on the phase $a_x$, the phase $a_y$, the phase $b_x$, the phase $b_y$, the phase $c_x$, and the phase $c_y$, which can be measured and recorded by the controller 70 during the initial calibration sequence.

Figure 7:
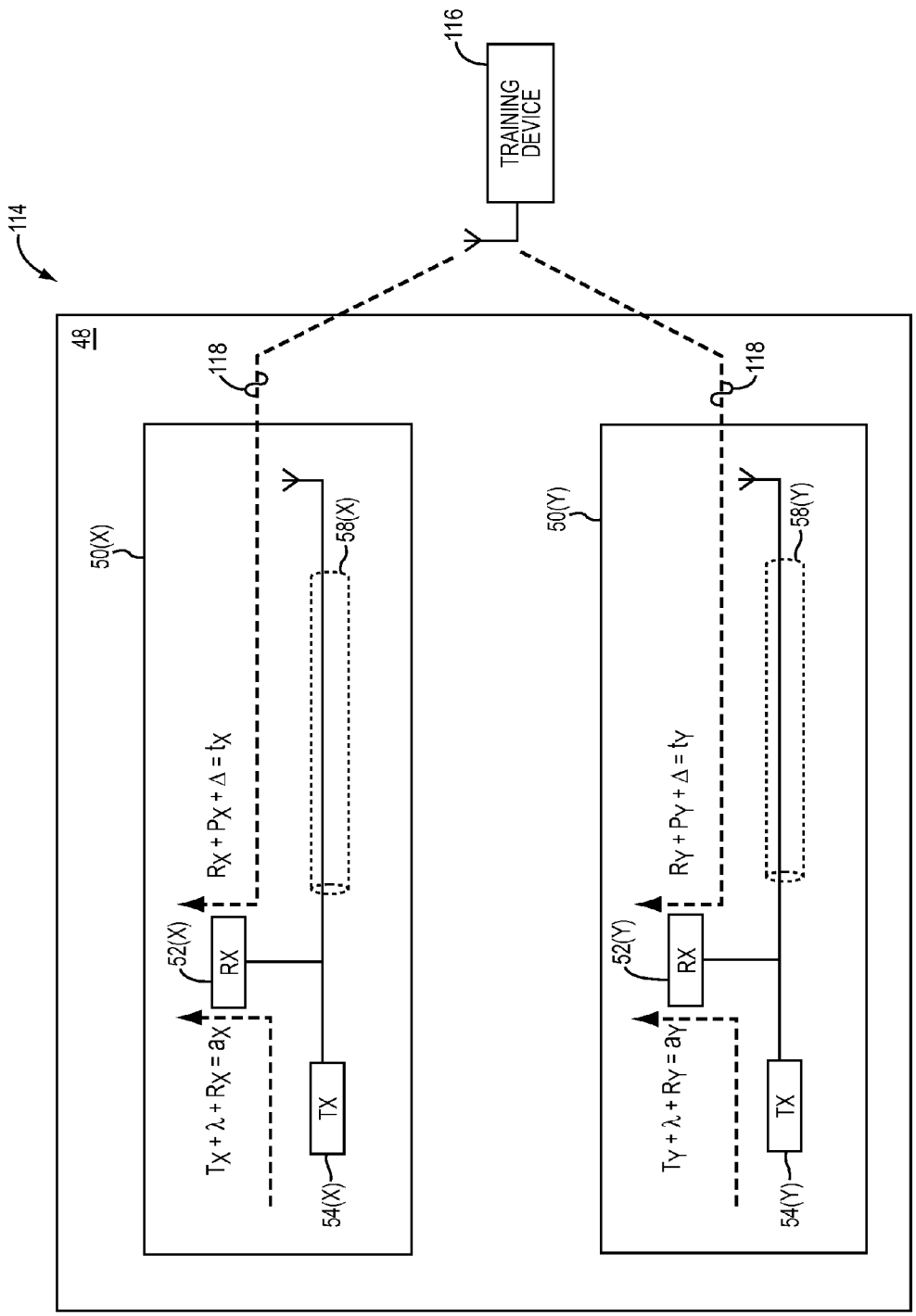
FIG. 7 is a schematic diagram of an exemplary configuration for performing a training sequence among the plurality of antenna elements of FIG. 3.

As previously mentioned, after completing the initial calibration sequence, the training sequence may be conducted to further determine the total relative phase error between each pair of antenna elements among the plurality of antenna elements 50(1)-50(M). In this regard, FIG. 7 is a schematic diagram of an exemplary configuration 114 for performing the training sequence among the plurality of antenna elements 50(1)-50(M) of FIG. 3. Common elements between FIGS. 3, 4, 5, 6, and 7 are shown therein with common element numbers and will not be re-described herein.

To perform the training sequence, a training device 116 transmits a wireless training signal 118 to the plurality of antenna elements 50(1)-50(M) in the wireless charging station 48. The receiver 52(X) of the reference antenna element 50(X) and the receiver 52(Y) of the non-reference antenna element 50(Y) receive the wireless training signal 118 simultaneously. The controller 70 measures a respective phase of the wireless training signal 118 at the receiver 52(X) (phase $t_x$) and at the receiver 52(Y) (phase $t_y$). The phase $t_x$ and the phase $t_y$ are both compounded by multiple factors that can be expressed respectively by equations Eq. 23 and Eq. 24 below.

$$\text{phase } t_x = R_X + P_X + \Delta \quad \text{(Eq. 23)}$$

$$\text{phase } t_y = R_Y + P_Y + \Delta \quad \text{(Eq. 24)}$$

With reference to the equations Eq. 23 and Eq. 24, $P_X$ represents a multipath phase shift experienced by the wireless training signal 118 when traveling from a transmitter of the training device 116 to the receiver 52(X) of the reference antenna element 50(X). $P_Y$ represents a multipath phase shift experienced by the wireless training signal 118 when traveling from the transmitter (not shown) of the training device 116 to the receiver 52(Y) of the non-reference antenna element 50(Y). $\Delta$ represents a phase differential between the transmitter and a receiver (not shown) in the training device 116.

Using the phase $t_x$ and the phase $t_y$ in connection with the phase $a_x$ and the phase $a_y$, which have been respectively determined during the initial calibration sequence according to the equations Eq. 1, 9, and 16 and the equations Eq. 2, 10, and 17, it is possible for the controller 70 to estimate a respective transmitter phase of the reference antenna element ($\phi_X$) and a respective transmitter phase of the non-reference antenna element ($\phi_Y$) based on the following equations Eq. 25 and Eq. 26, respectively.

$$\phi_X = T_X + P_X = a_x + t_x - 2R_X - \lambda - \Delta \quad \text{(Eq. 25)}$$

$$\phi_Y = T_Y + P_Y = a_y + t_y - 2R_Y - \lambda - \Delta \quad \text{(Eq. 26)}$$

Based on the equations Eq. 25 and Eq. 26, the controller 70 can determine a total relative phase error ($\phi_Y - \phi_X$) between the non-reference antenna element 50(Y) and the reference antenna element 50(X) based on equation Eq. 27 below.

$$\phi_Y - \phi_X = (a_y + t_y) - (a_x + t_x) - 2(R_Y - R_X) \quad \text{(Eq. 27)}$$

With reference to the equation Eq. 27, $R_Y - R_X$ represents the relative receiver phase error between the non-reference antenna element 50(Y) and the reference antenna element 50(X), which has been determined during the initial calibration sequence. In this regard, if the initial calibration sequence is conducted based on the first configuration 76 of FIG. 4, the controller 70 can determine the relative receiver phase error ($R_Y - R_X$) based on the equation Eq. 8. Thus, by substituting the $R_Y - R_X$ in the equation Eq. 27 with the $R_Y - R_X$ in the equation Eq. 8, the total relative phase error ($\phi_Y - \phi_X$) can be expressed as equation Eq. 28 below.

$$\phi_Y - \phi_X = (b_y + t_y) - (b_x + t_x) \quad \text{(Eq. 28)}$$

If the initial calibration sequence is conducted based on the second configuration 82 of FIG. 5 or the third configuration 98 of FIG. 6, the relative receiver phase error ($R_Y - R_X$) is determined by either the equation Eq. 15 or the equation Eq. 22. Thus, by substituting the $R_Y - R_X$ in the equation Eq. 27 with the $R_Y - R_X$ in the equation Eq. 15 or the equation Eq. 22, the total relative phase error ($\phi_Y - \phi_X$) can be expressed as equation Eq. 29 below.

$$\phi_Y - \phi_X = (t_y + b_y - c_y) - (t_x + b_x - c_x) \quad \text{(Eq. 29)}$$

The training sequence described above is based on an assumption that some kind of reciprocity exists between the training device 116 and the plurality of antenna elements 50(1)-50(M). That is, the multipath amplitude and phase changes experienced by the wireless training signal 118 are the same as the amplitude and phase changes the plurality of antenna elements 50(1)-50(M) would experience when transmitting wireless RF charging signals. Because of this reciprocity assumption, it is possible for the controller 70 to estimate the total relative phase error ($\phi_Y - \phi_X$) between the non-reference antenna element 50(Y) and the reference antenna element 50(X) based on the multipath phase shifts $P_X$ and $P_Y$ of the wireless training signal 118 in the equations Eq. 25-27. However, the reciprocity assumption may not always be true. Hence, it may be necessary to validate phase coherence among the plurality of antenna elements 50(1)-50(X) after conducting the initial calibration sequence and the training sequence.

Figure 8:
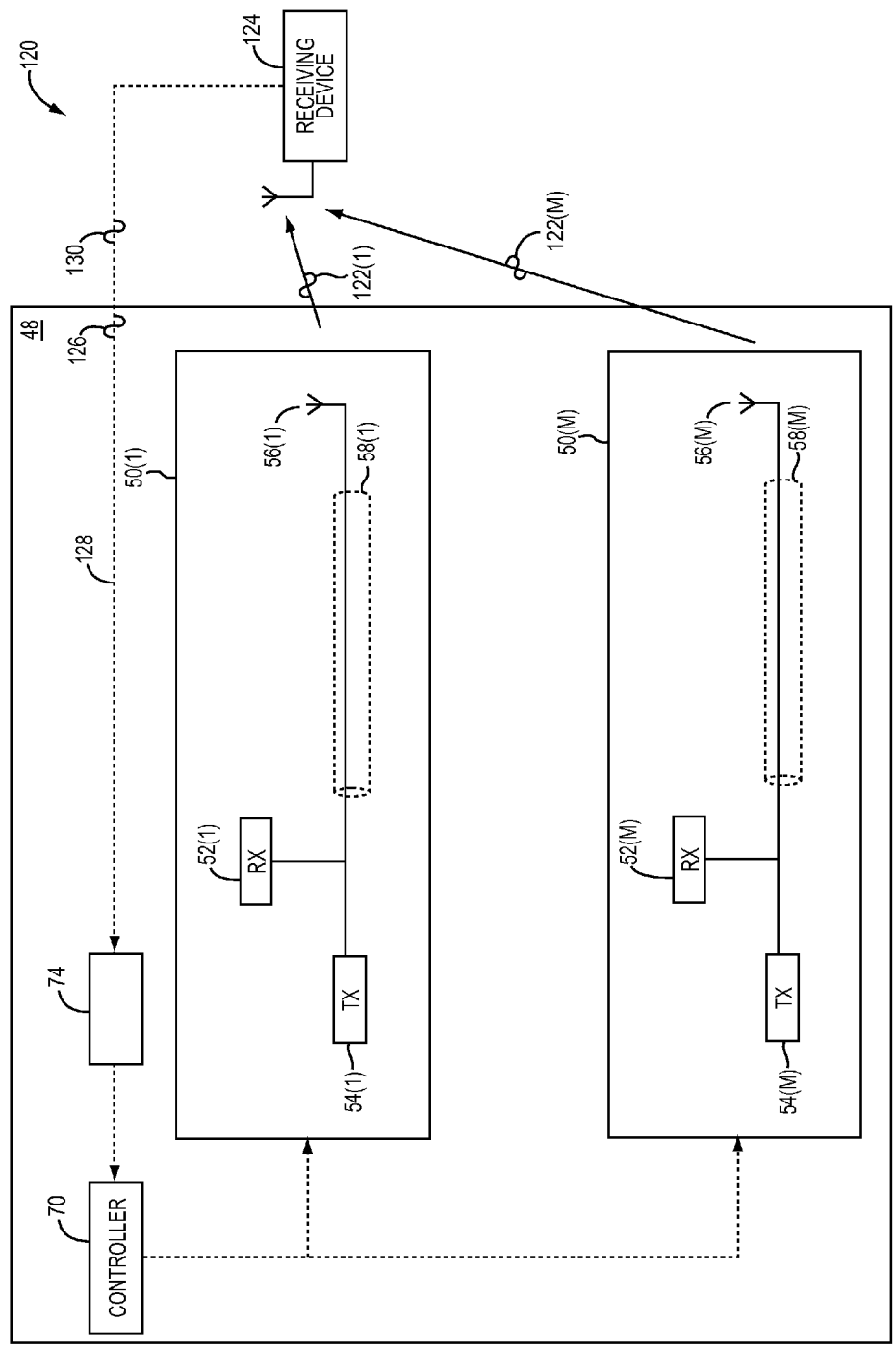
FIG. 8 is a schematic diagram of an exemplary configuration for verifying phase coherency among the plurality of antenna elements of FIG. 3.

In this regard, FIG. 8 is a schematic diagram of an exemplary configuration 120 for verifying phase coherency among the plurality of antenna elements 50(1)-50(M). Common elements between FIGS. 3, 4, and 8 are shown therein with common element numbers and will not be re-described herein.

With reference to FIG. 8, the controller 70 instructs the plurality of antenna elements 50(1)-50(M) to transmit a plurality of wireless signals 122(1)-122(M) to a receiving device 124. The receiving device 124 provides a first power measurement 126, which indicates a first total power received from the plurality of wireless signals 122(1)-122(M), to the controller 70 via a wireless link 128. In a non-limiting example, the wireless link 128 operates in one of the ISM bands. In another non-limiting example, the wireless link 128 may operate based on Wi-Fi, Bluetooth, BLE, and ZigBee communication protocols. In another non-limiting example, the wireless link 128 may be established between the receiving device 124 and the wireless communication interface 74 in the wireless charging station 48.

The controller 70 then instructs at least one antenna element among the plurality of antenna elements 50(1)-50(M) to increase power level of at least one wireless signal among the plurality of wireless signals 122(1)-122(M) by a predetermined amount $P_{UP}$. The receiving device 124 subsequently provides a second power measurement 130, which indicates a second total power received from the plurality of wireless signals 122(1)-122(M), to the controller 70 via the wireless link 128. If phase coherency exists among the plurality of antenna elements 50(1)-50(M), the second power measurement 130 shall increase from the first power measurement 126 by the predetermined amount $P_{UP}$. If the second power measurement 130 does not increase from the first power measurement 126 by the predetermined amount $P_{UP}$, it can be concluded that the plurality of antenna elements 50(1)-50(M) are phase incoherent.

Those skilled in the art will recognize improvements and modifications to the embodiments of the present disclosure. All such improvements and modifications are considered within the scope of the concepts disclosed herein and the claims that follow.

What is claimed is:

1. A wireless charging station, comprising:
   a plurality of antenna elements each comprising:
      a receiver and a transmitter coupled to an antenna; and
      a phase shift circuitry coupled to the transmitter and configured to adjust transmitter phase of the transmitter; and a controller coupled to the plurality of antenna elements and configured to:
select a reference antenna element from the plurality of antenna elements wherein unselected ones of the plurality of antenna elements are non-reference antenna elements; and
for each of the non-reference antenna elements:
transmit a first calibration signal from a transmitter of the reference antenna element;
measure phase $a_x$ of the first calibration signal at a receiver of the reference antenna element;
measure phase $b_x$ of the first calibration signal at a receiver of a non-reference antenna element;
transmit a second calibration signal from a transmitter of the non-reference antenna element;
measure phase $a_y$ of the second calibration signal at the receiver of the non-reference antenna element;
measure phase $b_y$ of the second calibration signal at the receiver of the reference antenna element; and
determine relative receiver phase error and relative transmitter phase error between the non-reference antenna element and the reference antenna element based on the phase $a_x$, the phase $a_y$, the phase $b_x$, and the phase $b_y$.

2. The wireless charging station of claim 1 wherein:
each of the plurality of antenna elements further comprises a register; and
the controller is further configured to store the relative receiver phase error and the relative transmitter phase error in the register of the reference antenna element and the register of the non-reference antenna element.

3. The wireless charging station of claim 1 wherein the controller is further configured to:
instruct the plurality of antenna elements to transmit a plurality of wireless signals to a receiving device, respectively;
receive a first power measurement from the receiving device indicating a first total power received by the receiving device from the plurality of wireless signals;
instruct at least one of the plurality of antenna elements to increase power level of at least one respective wireless signal by a predetermined amount;
receive a second power measurement from the receiving device indicating a second total power received by the receiving device from the plurality of wireless signals;
determine that the plurality of antenna elements is phase coherent if the second power measurement increases from the first power measurement by the predetermined amount; and
determine that the plurality of antenna elements is phase incoherent if the second power measurement does not increase from the first power measurement by the predetermined amount.

4. The wireless charging station of claim 3 wherein the controller is further configured to receive the first power measurement and the second power measurement via a wireless link in one of the industrial, scientific, and medical (ISM) bands.

5. The wireless charging station of claim 1 wherein the controller is further configured to:
configure the plurality of antenna elements to receive a wireless training signal from a training device;
measure phase $t_x$ of the wireless training signal at the receiver of the reference antenna element;
estimate transmitter phase of the reference antenna element based on the phase $t_x$; and for each of the non-reference antenna elements:
measure phase $t_y$ of the wireless training signal at the receiver of the non-reference antenna element;
estimate transmitter phase of the non-reference antenna element based on the phase $t_y$; and
determine total relative phase error between the transmitter phase of the non-reference antenna element and the transmitter phase of the reference antenna element.

6. The wireless charging station of claim 5 wherein the controller is further configured to match the total relative phase error among the plurality of antenna elements.

7. The wireless charging station of claim 5 wherein the controller is further configured to:
instruct the plurality of antenna elements to transmit a plurality of wireless signals to a receiving device, respectively;
receive a first power measurement from the receiving device indicating a first total power received by the receiving device from the plurality of wireless signals;
instruct at least one of the plurality of antenna elements to increase power level of at least one wireless signal by a predetermined amount;
receive a second power measurement from the receiving device indicating a second total power received by the receiving device from the plurality of wireless signals;
determine that the plurality of antenna elements is phase coherent if the second power measurement increases from the first power measurement by the predetermined amount; and
determine that the plurality of antenna elements is phase incoherent if the second power measurement does not increase from the first power measurement by the predetermined amount.

8. The wireless charging station of claim 7 wherein the controller is further configured to receive the first power measurement and the second power measurement via a wireless link in one of the industrial, scientific, and medical (ISM) bands.

9. The wireless charging station of claim 5 wherein the controller is further configured to determine the total relative phase error between the transmitter phase of the non-reference antenna element and the transmitter phase of the reference antenna element by adding the phase $t_y$ and the phase $b_y$ and subtracting the phase $t_x$ and the phase $b_x$.

10. The wireless charging station of claim 5 wherein the controller is further configured to measure the phase $t_x$ by calculating a sum of:
a phase shift ($R_x$) associated with the receiver of the reference antenna element;
a multipath phase shift ($P_x$) experienced by the wireless training signal when traveling from a transmitter of the training device to the receiver of the reference antenna element; and
a phase differential ($\Delta$) between the transmitter and a receiver in the training device.

11. The wireless charging station of claim 5 wherein the controller is further configured to measure the phase $t_y$ by calculating a sum of:
a phase shift ($R_y$) associated with the receiver of the non-reference antenna element;
a multipath phase shift ($P_y$) experienced by the wireless training signal when traveling from a transmitter of the training device to the receiver of the non-reference antenna element; and
a phase differential ($\Delta$) between the transmitter and a receiver in the training device.

12. The wireless charging station of claim 5 wherein the plurality of antenna elements is configured to receive the wireless training signal at a same frequency as the first calibration signal and the second calibration signal.

13. The wireless charging station of claim 1 wherein the controller is further configured to determine the relative receiver phase error between the non-reference antenna element and the reference antenna element by:
- calculating a first sum by adding the phase $a_y$ and the phase $b_x$;
- calculating a second sum by adding the phase $a_x$ and the phase $b_y$; and
- subtracting the second sum from the first sum and then dividing by two.

14. The wireless charging station of claim 1 wherein the controller is further configured to determine the relative transmitter phase error between the non-reference antenna element and the reference antenna element by:
- calculating a first sum by adding the phase $a_y$ and the phase $b_y$;
- calculating a second sum by adding the phase $a_x$ and the phase $b_x$; and
- subtracting the second sum from the first sum and then dividing by two.

15. The wireless charging station of claim 1 wherein the controller is further configured to measure the phase $a_x$ by calculating a sum of:
- a phase shift ($T_X$) associated with the transmitter of the reference antenna element;
- a phase shift ($R_X$) associated with the receiver of the reference antenna element; and
- a phase shift ($\lambda$) associated with coupling the receiver of the reference antenna element to the transmitter of the reference antenna element to receive the first calibration signal.

16. The wireless charging station of claim 1 wherein the controller is further configured to measure the phase $a_y$ by calculating a sum of:
- a phase shift ($T_Y$) associated with the transmitter of the non-reference antenna element;
- a phase shift ($R_Y$) associated with the receiver of the non-reference antenna element; and
- a phase shift ($\lambda$) associated with coupling the receiver of the non-reference antenna element to the transmitter of the non-reference antenna element to receive the second calibration signal.

17. The wireless charging station of claim 1 wherein the controller is further configured to measure the phase $b_x$ by calculating a sum of:
- a phase shift ($T_X$) associated with the transmitter of the reference antenna element;
- a phase shift ($R_Y$) associated with the receiver of the non-reference antenna element; and
- a phase shift ($P_{XY}$) associated with a signal path that conveys the first calibration signal from the transmitter of the reference antenna element to the receiver of the non-reference antenna element.

18. The wireless charging station of claim 1 wherein the controller is further configured to measure the phase $b_y$ by calculating a sum of:
- a phase shift ($T_Y$) associated with the transmitter of the non-reference antenna element;
- a phase shift ($R_X$) associated with the receiver of the reference antenna element; and
- a phase shift ($P_{YX}$) associated with a signal path that conveys the second calibration signal from the receiver of the non-reference antenna element to the transmitter of the reference antenna element.

19. The wireless charging station of claim 1 wherein the non-reference antenna element is configured to transmit the second calibration signal at a same frequency as the first calibration signal.

20. The wireless charging station of claim 1 wherein the non-reference antenna element is configured to transmit the second calibration signal at a different frequency from the first calibration signal.

* * * * *

UNITED STATES PATENT AND TRADEMARK OFFICE
CERTIFICATE OF CORRECTION

PATENT NO. : 9,837,712 B2  
APPLICATION NO. : 14/843465  
DATED : December 5, 2017  
INVENTOR(S) : Nadim Khlat Page 1 of 1

It is certified that error appears in the above-identified patent and that said Letters Patent is hereby corrected as shown below:

In the Specification

In Column 9, Line 29, replace "$\Delta$" with -- $\lambda$ --.

Signed and Sealed this  
Fifth Day of June, 2018

Andrei Iancu  
*Director of the United States Patent and Trademark Office*